(12) United States Patent
Chou

(10) Patent No.: US 7,202,801 B2
(45) Date of Patent: Apr. 10, 2007

(54) METHOD AND APPARATUS FOR AN AUTOMATED LOCATION-BASED, DYNAMIC NOTIFICATION SYSTEM (ALDNS)

(75) Inventor: Y. Hong Chou, Fountain Valley, CA (US)

(73) Assignee: Geospatial Technologies, Inc., Santa Ana, CA (US)

( * ) Notice: Subject to any disclaimer, the term of this patent is extended or adjusted under 35 U.S.C. 154(b) by 982 days.

(21) Appl. No.: 10/317,461

(22) Filed: Dec. 11, 2002

(65) Prior Publication Data

US 2004/0113772 A1 Jun. 17, 2004

(51) Int. Cl.
G08G 1/123 (2006.01)

(52) U.S. Cl. ...................... 340/994; 340/991
(58) Field of Classification Search ............... 340/988, 340/989, 990, 991, 992, 993, 994, 995.24; 701/207, 208, 211, 213
See application file for complete search history.

(56) References Cited

U.S. PATENT DOCUMENTS

| | | | |
|---|---|---|---|
| 5,400,020 A | 3/1995 | Jones et al. | |
| 5,515,285 A | 5/1996 | Garrett, Sr. et al. | |
| 5,587,715 A | 12/1996 | Lewis | |
| 5,648,770 A * | 7/1997 | Ross | 340/994 |
| 5,809,396 A | 9/1998 | Armbruster et al. | |
| 5,841,396 A | 11/1998 | Krasner | |
| 5,920,821 A | 7/1999 | Seaholtz et al. | |
| 5,959,577 A | 9/1999 | Fan et al. | |
| 6,088,594 A | 7/2000 | Kingdon et al. | |
| 6,091,957 A | 7/2000 | Larkins et al. | |
| 6,133,853 A | 10/2000 | Obradovich et al. | |
| 6,141,621 A | 10/2000 | Piwowarski et al. | |
| 6,177,905 B1 | 1/2001 | Welch | |
| 6,185,427 B1 | 2/2001 | Kraner et al. | |
| 6,188,956 B1 | 2/2001 | Walters | |
| 6,198,390 B1 | 3/2001 | Schlager et al. | |
| 6,199,010 B1 | 3/2001 | Richton | |
| 6,202,023 B1 | 3/2001 | Hancock et al. | |
| 6,212,472 B1 | 4/2001 | Nonaka et al. | |
| 6,212,474 B1 | 4/2001 | Fowler et al. | |
| 6,222,483 B1 | 4/2001 | Twitchell et al. | |
| 6,225,944 B1 | 5/2001 | Hayes | |
| 6,226,590 B1 | 5/2001 | Fukaya et al. | |
| 6,236,358 B1 | 5/2001 | Durst et al. | |
| 6,236,365 B1 | 5/2001 | LeBlanc et al. | |
| 6,278,936 B1 | 8/2001 | Jones | |
| 6,314,308 B1 | 11/2001 | Sheynblat et al. | |
| 6,317,060 B1 | 11/2001 | Jones | |

(Continued)

*Primary Examiner*—Brent A. Swarthout
(74) *Attorney, Agent, or Firm*—Myers Dawes Andras & Sherman LLP; Vic Lin

(57) ABSTRACT

An automated, location-based, dynamic notification system comprises a mobile unit hardware device and a control center computer facility with communication capabilities. The mobile unit comprises a position module, a location processor, an action processor, a data module, and an I/O module. The control center comprises a system processor, a communication module, and a master database. The system provides notifications of arriving, approaching, leaving, entering, and any other types of location-related notifications, which are issued in an automatic, unattended manner. The illustrated embodiments of the invention are based on location and thus are used in a dynamic routing situation where both route patterns and stop locations change frequently while the object is moving. The system requires no interaction from the driver or the dispatcher, requires no on-board checking or manipulation of a schedule, and applies in many situations including special-education transportation, prisoner transportation, airport shuttle service.

49 Claims, 5 Drawing Sheets

ALDNS System Overview

U.S. PATENT DOCUMENTS

| | | |
|---|---|---|
| 6,327,533 B1 | 12/2001 | Chou |
| 6,363,320 B1 | 3/2002 | Chou |
| 6,502,033 B1 * | 12/2002 | Phuyal ........................ 701/214 |
| 6,618,668 B1 * | 9/2003 | Laird ........................ 701/204 |
| 6,700,506 B1 * | 3/2004 | Winkler et al. ............. 340/994 |
| 2002/0070882 A1 * | 6/2002 | Jones ........................ 340/988 |
| 2002/0099500 A1 * | 7/2002 | Schmier et al. ............. 701/200 |

\* cited by examiner

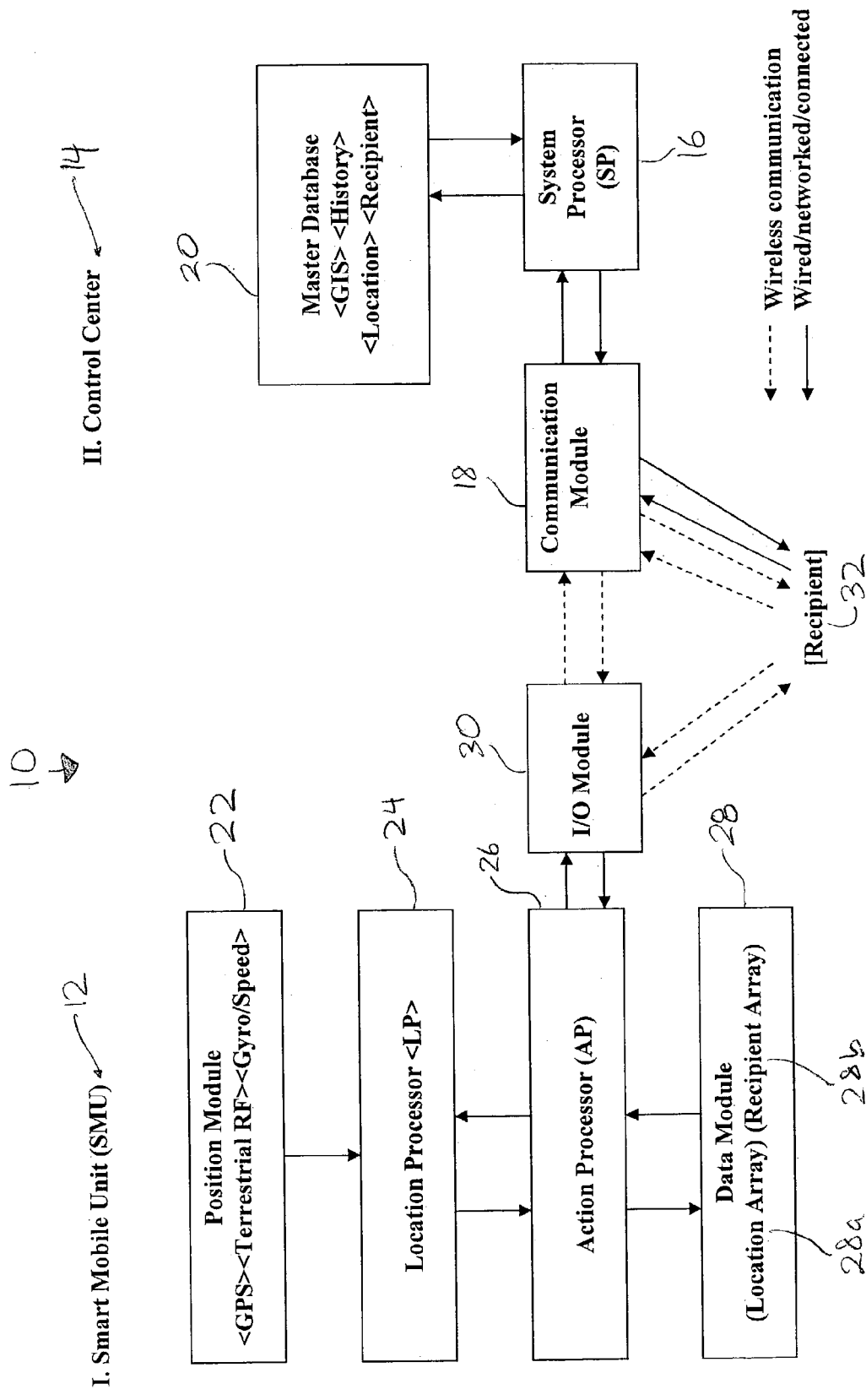
Fig. 1 ALDNS System Overview

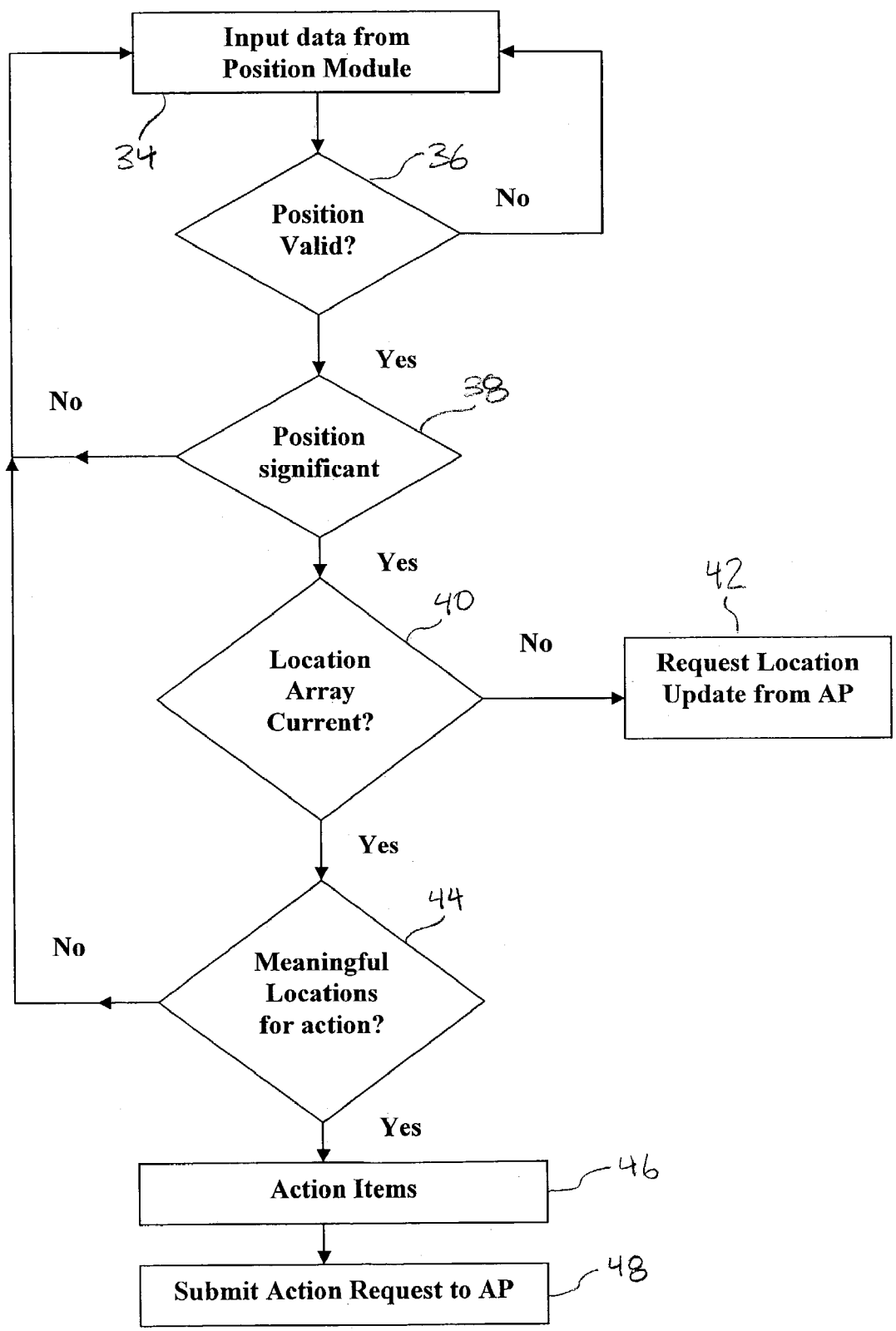
Fig. 2 Location Processor

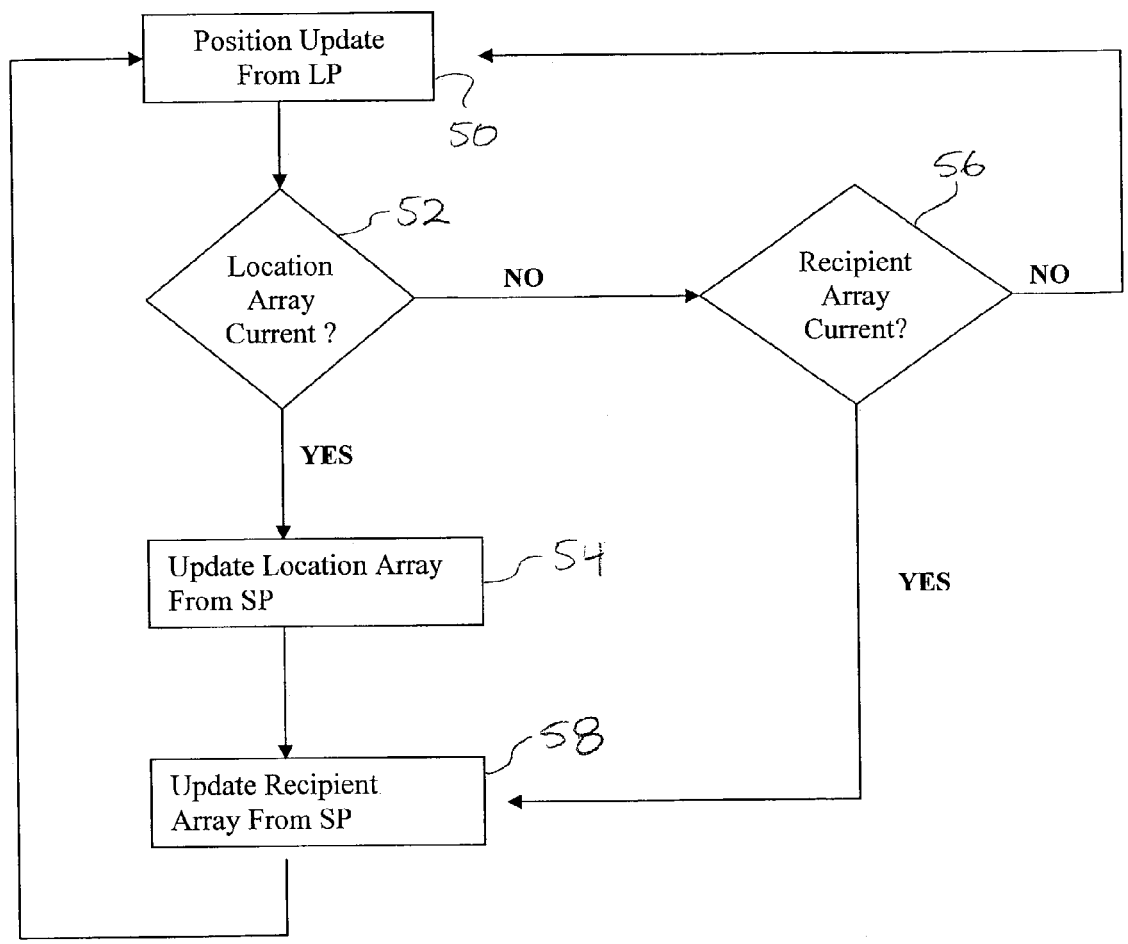
Fig. 3 Location/Recipient Array Update

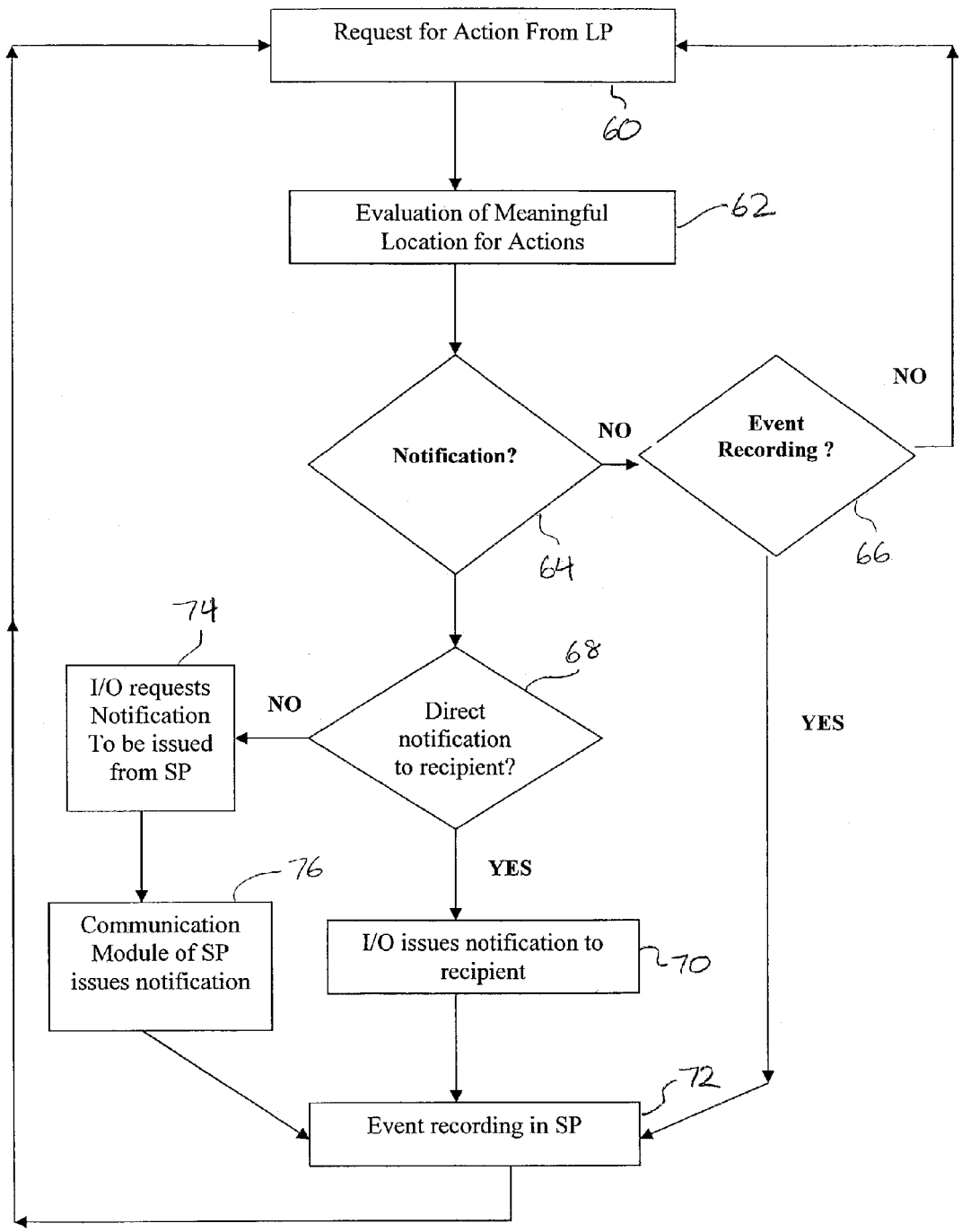
Fig. 4 Notification Processing

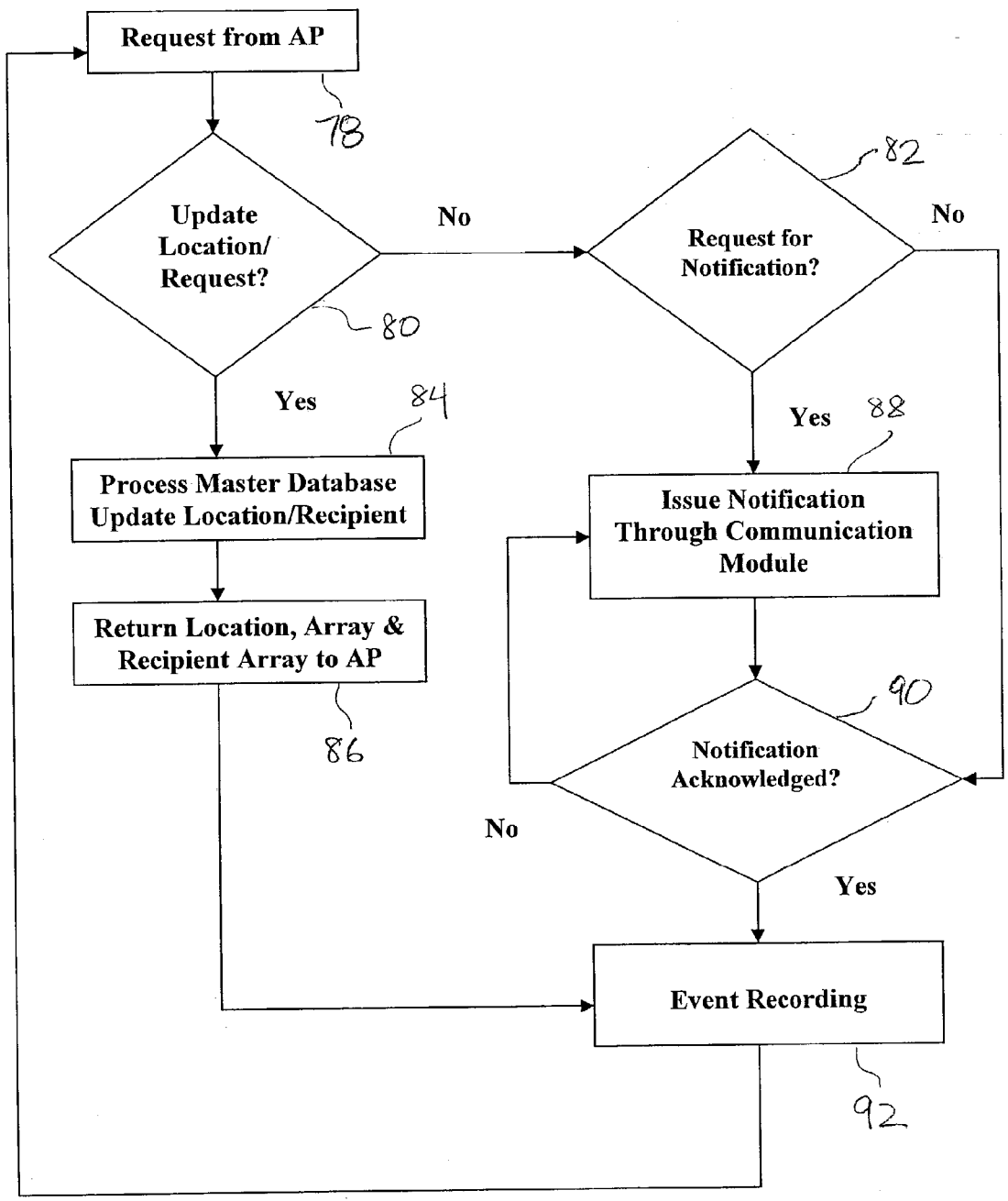
Fig. 5 Control Center

METHOD AND APPARATUS FOR AN AUTOMATED LOCATION-BASED, DYNAMIC NOTIFICATION SYSTEM (ALDNS)

BACKGROUND OF THE INVENTION

1. Field of the Invention

This invention relates to the field of computer software and hardware. Specifically the present invention relates to a method and apparatus for automatically issuing notifications to recipients about certain status and location-related information associated with a moving object such as a vehicle, a bus, a truck, a bicycle, a container, a package, or any other types of moving objects.

2. Description of the Prior Art and Related Information

Notification of the arrival of a vehicle has been a common subject of invention. The prior art suffers from major design flaws that make them impractical in actual implementations and hence none of those methods presented in the prior art have actually been implemented.

The three items by Ross listed below are based on a very similar methodology and differ slightly in the application of the general method.

Both Ross, "Apparatus And Method Of Notifying A Recipient Of An Unscheduled Delivery," U.S. Pat. No. 5,444,444 (1995) and Ross, "Apparatus And Method Of Notifying A Party Of A Pending Delivery Or Pickup," U.S. Pat. No. 5,648,770, (July 1997) are designed for the notification of a pending delivery or pickup. Ross '444 and '770 employ an old-fashioned on-board card reader for passengers to register identification, and an on-board mechanical distance-measuring device. Both devices are obsolete and no longer available on the market.

In Ross '444, the method of notification is schedule-based, i.e., the list of stops of a trip must be pre-determined and the sequence of the stops is fixed during the trip. The method is static in the sense that the trip schedule, the locations of stops, and the sequence of the stops are all fixed throughout the trip. The preferred embodiment contains an on-board notebook computer with keyboard and display, in order for the driver to take actions throughout the trip. The method is clearly interactive, i.e., the operation of the notification system requires some interaction from the driver during the trip. Ross '444 presents a notification system characterized as schedule-based, static, and interactive.

Ross '770 applies the same apparatus and the same method to the same purpose of pending delivery or pickup for a slightly different scenario. While the method of Ross '444 is applied to one item per stop along the route, Ross '770 allows for selection of one item from a set of multiple items at any given stop. The expansion from Ross '444 to Ross '770 allows multiple items to be delivered at the same stop location, instead of one item at the same location. The method presented in Ross '770 remains schedule-based, static, and interactive.

Ross, "Apparatus And Method For Tracking And Reporting The Location Of A Motor Vehicle," U.S. Pat. 5,673,305 (1997) is essentially the same method as in Ross '444 and '770 but is applied to a method of reporting a stolen vehicle. In this case, the method involves one single item and relates to notification under a special circumstance. Ross '305 does not address notification of arrival, approaching a location, entering a location, leaving a location, or any other types of vehicle status.

A second group of prior art arrival-notification methods is presented in Jones, "System And Method For An Advance Notification System For Monitoring And Reporting Proximity Of A Vehicle," U.S. Pat. No. 6,278,936 (2001); Jones, "Base Station System And Method For Monitoring Travel Of Mobile Vehicles And Communicating Notification Messages," U.S. Pat. No. 6,317,060 (2001); Jones, "Advance Notification System And Method Utilizing User-Definable Notification Period," U.S. Pat. No. 6,411,891 (2002); and Jones, et al., "Advanced Notification System And Method," U.S. Pat. No. 5,400,020 (1995). These methods can be categorized as methods of schedule-based notification, static notification with fixed stop sequence, on-board clock, and fixed-route notification. Each of these methods are based on a fixed schedule of a trip. Whether or not a notification should be issued and when should the notification be issued are based on the preset schedule of the trip. In any case, a schedule is required for the notification operation. Due to the nature of a scheduled activity, the route of a vehicle is fixed and any change in the route must be made prior to the start of the trip. Any change in the route pattern, the sequence of stops, the addition or removal of stops, and the change of streets of the route, is not acceptable for any of the methods to work.

Since Jones' methods are based on a fixed schedule, issuance of a notification requires the comparison between the elapsed time for each stop and the scheduled time. For example, in Jones '020, a vehicle clock must be used to compare the elapsed time at each stop to the scheduled arrival time at that stop, in order to determine if the bus is on schedule or off schedule. In Jones '060 the system requires a "schedule monitor" to determine if the vehicle is off schedule. In Jones '891, the vehicle control unit (VCU) must compare the elapsed time and/or traveled distance against the schedule. Clearly, all these methods are schedule-based and their decision making mechanism requires a fixed schedule set before a trip starts.

In Jones' methods, all the stop locations are determined by the schedule and are fixed before the trip starts. At each stop on the scheduled route, a mechanism is required to enter a code of the location of the bus stop, and a clock on the vehicle must compare the elapsed time from the previous time point (previous bus stop on the route), in order to determine if the bus is on schedule or not. An action from the driver will be required if the current time on the bus at the current bus stop location is different from the scheduled time by a preset threshold. If the time difference is greater than the preset threshold, the communication means on the bus will send a message to the base station. The base station then makes phone calls to the students that are supposed to board the bus at the given stop location. In other words, the prior art requires a fixed sequence of pre-determined stop locations.

A clock on the vehicle is needed in order to compare the elapsed time from a previous stop to a current stop, and to compare the elapsed time to the scheduled arrival at the current stop to determine whether the vehicle is off schedule beyond a preset interval. The driver will have to look at the clock and compare it with the schedule, and either signal the need to issue an arrival notification if it is off schedule, or continue the trip without issuing a notification if the vehicle is on schedule.

When the vehicle is off schedule at a particular stop, the driver must adjust the schedule for the rest of the trip because every subsequent stop will be affected by the delay at the stop. In this case, the driver has to correct the schedule for the rest of the trip. This step requires driver's interaction.

Jones' methods are not of practical value because the system requires a fixed schedule, fixed route, and driver's interaction along the route. The driver must read the time from the on-board clock when arriving at any stop, and calculate if the elapsed time is within the scheduled arrival time, and decide if a notification should be issued to the passengers of the next stop. If the elapsed time is over what is allowed by the schedule, then the driver must take additional action to adjust the schedule. The requirement of actions by either the driver or the dispatcher makes Jones' methods impractical for implementations.

To avoid comparing the elapsed time with the scheduled time, Jones presented another method to determine if the vehicle is off schedule by computing traveled distance between stops. To do so, some distance measurement tool such as an odometer detector must be implemented to determine the position based on the mileage measurement. The system thus will require linking to the odometer and determining bus stop locations based on the odometer reading. In addition, a door detector is also necessary in order to use it as an input means corresponding to stop locations. Using either an odometer detector or a door detector in order to estimate the distance traveled between two stops is unrealistic and has not been implemented.

Jones' methods require notifications be sent from the base station. In reality, certain notifications may be better sent from the vehicle directly to the recipient. Lacking the flexibility to issue notifications from the vehicle makes the methods less applicable.

Jones' methods are limited to a fixed-route scheduling operation. The bus must travel through the route that is previously fixed. Students are expected to come to the bus stop to board the bus. The methods are not feasible for implementation due to the different expectations in reality. In reality, students are told to go to the bus stop at a given range of time. If the bus is late for a short period of time, there is no need to call the students. If the bus is earlier, students are not ready because they are expected to go to the bus stop at a fixed range of time, instead of waiting for an instruction on the fly. If the bus is late for a short period of time, then the student will have already left home, heading towards the stop, or waiting at the stop. Calling students' homes to inform a late arrival for a short period of time is unnecessary and impractical—it is unlikely that any student will stay home to wait for that call. If the bus is late for a long period of time, the school transportation must identify other means of remedial bussing service to pick up the students. It is unlikely for the school to tell the students to wait at home for another forty-five minutes due to the late arrival. In other words, Jones' methods have a major flaw in that they conflict with the actual or expected behaviors.

Jones' methods are limited to a fixed route, or a fixed sequence of bus stops, in order for the scheduled arrival time at each stop to be compared to the on-board clock to determine if a notification is warranted. This limitation makes the method useless because the only need for pre-arrival notification is for a variable route on a dynamic scheduling situation, which is quite different from the design of Jones' methods for static routing. A typical variable, dynamic routing is useful for buses equipped with special instruments to handle wheelchairs. In this situation, the bus route is not fixed because the passengers change on a daily basis due to their different schedules. The route changes on a daily basis and the driver may pick up students in any sequence appropriate. Therefore, the route cannot be strictly fixed. Jones' methods are designed for the fixed route where students go to the bus stop to board the bus. In the dynamic routing situation, that stop could be a variable and actually the bus goes to the house to pick up students, rather than for students to go to the bus stop to board a bus.

To make a pre-arrival notification for a dynamic route, the decision to make or not make a call cannot rely on the position entered at a bus stop or fixed location according to a fixed schedule. Comparisons between a scheduled arrival time at a specific stop and the actual arrival time at that same position will not work because the bus may take a different route in a different way. The bus may skip one location because that student will not go to school that day. In this case, the bus does not need to follow that same route pattern because skipping a location makes the route different, i.e., a better path can be taken without going in and out a neighborhood. In this case, some stops may be skipped and other stops may be added, and Jones' methods requiring comparison between the scheduled arrival time at a specific stop cannot handle the dynamic routing situation.

Jones' methods are at best applicable to a fixed route situation and thus the present invention is much more versatile and capable than Jones' methods. The present invention can handle a dynamic routing situation where bus stops may change on a daily basis and even while the bus is running on streets. In other words, the present invention enables a driver to leave the transportation yard and, while on the way to reach one student's house or a bus stop, make a change in real time to alter the route. There is no need for the driver to do anything concerning the schedule, the route, the stops, and the notification. While the route has been changed, any need of pre-arrival notification can be issued for any student's house or any stop on the way, and the notification can be issued automatically without the driver's interaction or any dispatcher's action. This is possible because the present invention does not rely on a fixed route schedule and does not need to compare the scheduled arrival time at any given location with the actual arrival time of the bus at that location.

In reality, notification of arrival time for fixed routes is not needed in school transportation. The notification of arrival time is useful only for dynamic routes where the bus may change its course at any time. Jones' methods cannot handle any dynamic routing situation and that may be the reason that since the methods was first presented in 1995, no school district has implemented any device based on this method.

What is needed is a system and methodology, which is not subject to the foregoing flaws of the prior art.

BRIEF SUMMARY OF THE INVENTION

The present invention corrects the design flaws of the prior art and introduces a new method and apparatus that can be implemented without the flaws of previous methods. The present invention is directed to an apparatus and method for an automated, location-based, dynamic notification system, ALDNS. The ALDNS comprises a smart mobile unit (SMU) hardware device and a control center computer facility with communication capabilities. The SMU comprises a position module, a location processor, an action processor, a data module, and an I/O module. The control center comprises a system processor, a communication module, and a master database.

Compared to the prior art that is schedule-based, ALDNS is location-based. The present invention is flexible and suitable for variable route in a dynamic setting, i.e., the route can be changed at any time during the trip, stop locations can be added or removed, and the stop sequence can be altered if necessary. The vehicle does not need to follow a fixed route, thus if a better route is available in order to avoid a bad traffic condition, ALDNS will still work without the need to adjust any schedule.

ALDNS does not need to have any on-board clock, neither does it need an on-board display. The driver does not need to compare the elapsed time at a stop, and does not need to adjust the schedule. In essence, ALDNS is an automated notification system that requires no interaction from either the driver or the dispatcher. ALDNS does not need to include any odometer detector because it does not need to calculate the distance traveled between stops.

The apparatus enables a variety of notifications, including notifications of arrival, approaching, leaving, passing, entering, and other types of notifications to be triggered by the position of the vehicle. Notifications can be issued in an automatic, unattended manner, and are applicable in many situations including special-education transportation, prisoner transportation, airport shuttle service, and others.

The apparatus is described below in the context of school transportation, although the same principles apply to all other operations such as prisoner buses, delivery trucks, airport shuttle service, etc. For a school bus to run on a dynamic route, such as the typical situation for wheel-chair buses, a set of locations where any notification may be issued are dynamically stored in the storage device on the mobile unit. The locations are marked as event triggers.

More specifically, an apparatus for an automated, location-based, dynamic notification system (ALDNS) communicating to a plurality of recipients in combination with an external positioning system for use with a mobile object. The apparatus comprises a smart mobile unit collocated with the object and a control center computer subsystem. The smart mobile unit comprises a position module, a location processor communicated to the position module, an action processor communicated to the location processor, a data module communicated to the action processor, and an I/O module communicated to the action processor. The control center computer subsystem comprises a system processor, a communication module communicated to the systems processor, and a master database communicated to the systems processor. The I/O module of the smart mobile unit and the communication module of the control center computer subsystem are intercommunicated with each other.

The position module comprises means for automatically generating location data corresponding to the position of the smart mobile unit as determined by communication with the external positioning system.

The action processor generates location-based data and the location processor comprises means for automatically processing the location data generated by the position module and the location-based data generated by the action processor.

The location processor automatically validates the location data received from the position module, automatically filters the location data received from the position module for redundancy, automatically associates a relationship between the location data and a locational feature stored in the data module with a need for notification action by the action processor, and automatically determines significance of the association based on locational information stored in the data module. More particularly, the location processor automatically determines the significance of the association based on locational information, which characterizes a point feature and a buffer zone associated with the point feature, line feature or polygonal feature. Thus, in general terms, the location processor automatically and contemporaneously determines the significance of the association based on locational information, which characterizes a plurality of features and a buffer zone associated with each of the plurality of features.

The location processor further selectively and automatically serves as a host for the action processor when the action processor is systematically updated, and the action processor selectively serves as a host for the location processor when the location processor is systematically updated. In other words, the action processor and location processor selectively and automatically serve as a host for each other when either one is systematically updated.

The location processor automatically generates a plurality of action demands and where a processor receives the plurality of action demands and prioritizes the plurality of action demands. The action processor automatically associates recipient identities stored in the data module with the prioritized plurality of action demands, and then automatically controls the I/O module to perform the prioritized plurality of action demands.

The action processor automatically generates at least one notification message sent to at least one of the plurality of recipients in response to one of the prioritized action demands. The notification message includes an identity of the recipient content of an informational message, and means of communication to the identified recipient. The action processor also automatically generates an event recording in response to one of the prioritized action demands.

The action processor further automatically generates a data array update of information stored in the data module in response to one of the prioritized action demands, which includes updates locational information stored in the data module according to the location data generated by the position module, and updates of recipient information stored in the data module according to the location data generated by the position module.

The I/O module provides communication to the recipient by wired or wireless means according to the event and recipient in question pursuant to selective control by the action processor.

The system processor automatically controls communication to and from the plurality of smart mobile units and to the master database through the communication module. The communication module provides communication to the recipient by wired or wireless means according to the event and recipient in question pursuant to selective control by the system processor.

The master data base stores: (a) records of all meaningful locations subject to possible action and information about recipients to whom notifications may be issued; (b) a geographic information system with a database of streets and map features; and/or (c) a database of detailed vehicle history and actions taken at each meaningful location.

The communication module receives location data from the position module corresponding to the location of the object, communicates updates to the data module, provides bidirectional communication with the recipients, receives updates to the master database, and receives event information for recordal from the smart mobile unit.

In the illustrated embodiment the location processor automatically associates a relationship only between the location data and a locational feature or a plurality of locational features stored in the data module with a need for notification action or a plurality of notification actions by the action processor.

The I/O module or communication module communicate the notification action, which includes notifications relating to arriving, approaching, leaving, entering, crossing, passing, or any other movement of the object. The I/O module or communication module contemporaneously communicates the notification action to multiple recipients through different communication channels. In the illustrated embodiment the different communication channels comprise at least two of the following: a land-based telephone network connected to a first recipient, a cellular phone network communicated to a second recipient, a text message to a PDA of a third recipient, or a computer network communicated to a fourth recipient.

In the illustrated embodiment at any given time the data module stores a subset of locational and recipient information stored in the master data base. The subset of locational and recipient information stored in the data module is automatically updated by the control center computer subsystem depending on location of the smart mobile unit.

The action processor controls the I/O module to selectively communicate directly with the recipient or control center computer subsystem.

In summary, the action processor receives a point location from the location processor based on a position fix determined by the position module and retrieves a plurality of locational features stored in the data module corresponding to the point location. The action processor retrieves all recipients stored in the data module which correspond to any one of the retrieved locational features and compiles a list of recipients for which a notification message is to be generated, the action processor generates the notification message and selectively communicates the notification message to all corresponding recipients through the I/O module, each notification message being communicated according to a selected means chosen from a plurality of different means of communication available with the recipients.

A method for automated location-based action which is based on the location of a mobile object, which may be implemented in an apparatus as disclosed above or in any other apparatus now known or later devised which is capable of performing the disclosed steps.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1 is a block diagram showing the major modules of the ALDNS system, namely a smart mobile unit (SMU) and control center.

FIG. 2 is a flow diagram, which illustrates the operation of the location processor.

FIG. 3 is a flow diagram which illustrates the operation of array updating handled by the action processor.

FIG. 4 is a flow diagram of the operation of notification processing carried out in the action processor.

FIG. 5 is a flow diagram of the operation that takes place in the control center.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The ALDNS system, generally denoted by reference numeral 10 in FIG. 1, comprises:

(1) a smart mobile unit, or simply mobile unit, generally denoted by reference numeral 12, which may comprise a hardware device to be installed in or on any moving object such as a bus, truck, bicycle, container, package, or anything that moves from one place to another; and (2) a control center, generally denoted by reference numeral 14, which comprises one or more facilities each equipped with a computer server 16, communication equipment 18, a geographic information system (GIS), and a master database 20.

System 10 operates on one or more communication networks, including regular land-based telephone networks, cellular phone networks, wireless digital data networks such as wireless local area networks (WLAN), localized radio systems (RF), and/or satellite communication networks.

FIG. 1 is the overview of the ALDNS system 10 comprising smart mobile unit (SMU) 12 and control center 14. Smart mobile unit 12 is installed in or on moving objects. Smart mobile unit 12 comprises a position module 22, a location processor (LP) 24, an action processor (action processor 26) 26, a data module 28, and an input/output (I/O) module 30. Control center 14 comprises a system processor (SP) 16, a master database 20, and a communication module 18. The communications between smart mobile unit 12 and either control center 14 or a recipient 32 of any notification is based on one or more wireless communications networks. Communications between control center 14 and recipient 32 can take place through either land-based telephone networks or any wireless communication networks. In FIG. 1, dashed lines with arrows denote wireless communications while solid lines with arrows indicate wired, networked, or physically connected communications.

The primary function of position module 22 is to obtain the current position of the object. Position module 22 requires at least a GPS receiver, including a GPS engine board connected to a GPS antenna. A GPS receiver is sufficient for most applications. However, to ensure a complete coverage of position detection, position module 22 may include additional receivers of terrestrial radio frequency (RF) for approximation of the position, and an internal gyro and speed circuit for calculation of the position. Position determining subsystems are well known in the art and any device now known or later devised which is capable of fixing at least a local or relative terrestrial position is deemed equivalent to the illustrated embodiment.

In the illustrated embodiment position module 22 constantly reads GPS signals from the GPS satellites through the GPS receiver. The GPS engine board detects the best satellite signals and interprets such signals into latitude and longitude readings (Lat/Long), along with the current time, estimated instant speed, direction of the movement, and altitude of the object. In reality, GPS signals may not be available always and the signals may not be valid everywhere.

If valid GPS signals are not available, a back-up position input means is one that receives radio frequencies from a terrestrial system and estimates the position mathematically. For instance, a receiver of a cellular network may detect the signal strength of the carrier-specific frequency from the three closest repeaters. The signal strengths of the three towers can be evaluated to derive mathematically an approximate position based on a geometric triangulation technique. Typical examples of such terrestrial wireless digital networks include the 800 MHz frequency adopted by NexTel, or the 900 MHz frequency employed by Cingular (previously BellSouth) for their two-way interactive pager network called Mobitex, and AT&T's Cellular Digital Packet Data (CDPD) network of similar frequency range. In addition, even a localized radio frequency (RF) commonly adopted by public safety and law enforcement agencies or school districts, such as the 850 MHz radio frequency adopted by the Brea System in Southern California, or the 450 MHz radio system adopted by West Palm Beach School District and St. Louis Unified School District, can also be configured to serve the same purpose. In this case, the position of the moving object can be estimated through the triangulation of signal strengths from three repeaters provided that the three repeaters can be identified and located.

In the worst case scenario, if neither GPS nor terrestrial RF is available at a specific location, a third means of position input in position module 22 can be implemented to constantly estimate the position using conventional internal gyro and speed calculators for dead reckoning. The gyro calculator estimates the movement of the object in three-dimensional space while the speed calculator derives the velocity at any given moment along each of the three axes.

With the GPS receiver and any other position input means, position module 22 constantly generates a set of Lat/Long readings to location processor 24 for processing of location data. An example, of a device capable of determining location automatically selecting among multiple positional systems is described in U.S. Pat. Nos. 6,327,533 and 6,363,320, which are assigned to the same assignee of the present application, and which are incorporated herein by reference.

Location processor 24 is a microprocessor which has embedded algorithms in firmware to process the position data obtained from position module 22 along with other location-based information passed from the next component, action processor 26. The embedded algorithms perform the functions as follows.

The first function of location processor 24 is to validate the position information constantly received from position module 22. Each position reading passed from position module 22 may be derived from the GPS or from other position input means. The position expressed in Lat/Long is examined for possible input errors. The GPS reading may indicate that insufficient signals are received and thus the GPS reading is invalid. This may happen, for example, when the object is just starting to move, is under a covered structure, or is blocked by high-rise buildings in an urban setting. The values of the Lat/Long readings may be unreasonable due to data error in the input process. For instance, an object in California reporting a Lat/Long reading along the equator is not valid even though the reading appears to be normal. To detect such errors, location processor 24 compares the time value in the position reading to that of the previous valid position reading, and calculates the differential of the Lat/Long pairs to generate a distance estimate. If the distance is beyond that possible given the maximum velocity of the object, the current position reading should be invalid. For instance, if the object is a bus and its maximum speed is 120 MPH, then the current position reading is considered invalid if the reading produces an estimated movement for the bus to move over 1,000 miles within three seconds. The object's maximum speed can be introduced as a parameter in location processor 24 and remotely changed from one type of object to the other. For instance, if the device is to be used in an aircraft, then the parameter of maximum speed must be changed. In order to be able to change this parameter through the wireless communications, system 10 requires at least two processors as presented. The mechanism of remotely resetting parameters is discussed below.

The second function of location processor 24 is to filter out both invalid and redundant position data from further consideration. The removal of invalid data is important to pass only valid position data to the next processor 26. The filtering of redundant data makes the system much more efficient than a system that takes all the position data without redundancy check. Most location tracking applications involve tremendous amounts of redundancy in position data. For instance, a series of GPS signals may indicate an identical location of the object for five hours at one-reading-per-second frequency, with all the data being perfectly valid. This happens whenever the object stops at the same location for five hours. The system only needs to know the first reading and the last reading that are five hours apart, and all other readings should be filtered out in location processor 24. With the filtering mechanism, the system keeps only two valid and significant GPS readings instead of 18,000 valid readings with redundant information.

The third function of location processor 24 is to determine if the current position of the object is associated with any meaningful locations for possible notification. This requires location processor 24 to analyze an array of meaningful location data, called location array 28a, which is stored in data module 28. For this purpose, it is necessary for the system to use a separate processor 26, i.e., a CPU separate from the one already in place for location processor 24, in order that comparison between the current position and the array of meaningful locations can be executed while the array of meaningful locations can be changed dynamically and in real time. The separate processor called action processor 26 is described below.

Whenever location processor 24 generates a set of information related to a valid and significant position, location processor 24 checks against the location array 28a retrieved from action processor 26. Location array 28a contains three primary categories of meaningful locations. First, there are point features such as students' houses, railroad crossings, landmarks, courts, jails, etc. Each of such locations is associated with a variable, significant buffer distance measure. For a student's house, the buffer distance measure could be 20 ft while that for a landmark of much larger structure could be 200 ft. In mathematical terms, a point feature is defined by a pair of Lat/Long readings plus a variable distance of buffer radius. Second, there are line features such as street centerlines, power lines, sewer lines, border lines between adjacent administrative divisions, etc. Each line is associated with a variable, significant buffer distance. In mathematical terms, each line feature is defined by an ordered series of connected points plus an expanded buffer zone covering the entire line feature. Third, there are polygon features such as lakes, parks, school campuses, transportation yards, shopping centers, traffic zones, administrative zones, etc. Each polygon feature is associated with a variable buffer distance extending outward from the boundaries of the polygon. In mathematical terms, each polygon feature is defined by a set of orderly connected line features that enclose a well-defined area, with a buffer area extending out from the boundaries of the polygon.

Location processor 24 takes the position and compares its Lat/Long with all the features listed in the location array 28*a*. It determines if the position falls within the radius buffer from any point feature, within the buffer area extending from a line feature, or within the area delineating the buffer zone around a polygon feature. If the evaluation generates a positive response, then location processor 24 records the feature being evaluated until all the features in the location array 28*a* have been evaluated. Upon completion of the evaluation of location array 28*a*, location processor 24 creates a temporary listing of locations with significant implications. These are the possible locations that may require a notification or any other action of the system. It is clear that this system 10 allows for simultaneous processing of events of multiple different types rather than for just arrival notification. For instance, the listing of meaningful locations may indicate that the bus is approaching five students' houses, crossing a railroad track, entering a 25 MPH traffic zone, and leaving a city park, etc. The listing of meaningful locations that demand actions from the system 10 is then passed to action processor 26 to handle.

The fourth function of location processor 24 is to serve as the temporary host whenever the operating system of action processor 26 requires a system update. This is a reciprocal function between location processor 24 and action processor 26 and the same function is performed by action processor 26 to be the host and update location processor's system. Whenever there is a need for action processor 26 to update its functional procedures, location processor 24 can take over all the current functions performed by action processor 26 and temporarily serves as the agent to update action processor 26. Conceptually, location processor 24 is like a person shutting down the computer known as action processor 26, replacing the operating system of that computer, removing existing applications, and then installing the new versions of the removed applications back on, and also replacing all the databases. Once the system on action processor 26 has been successfully upgraded, location processor 24 then releases its temporary role as its host and the whole procedure will not lose any information during the system upgrade.

FIG. 2 is a flow diagram which illustrates the operation of the location processor 24. Location processor 24 continuously receives input data from the position module 22 as depicted by step 34. Each received record is evaluated for validity at step 36. If the record is not valid, location processor 24 disregards the invalid record and processes the next input record at step 34. For example, an invalid record could be a GPS reading with a Latitude reading of 0.000000 and a Longitude reading of 0.000000 for an object moving in the North American continent. Such a reading is definitely invalid and ruled out from further consideration.

A valid position record is then processed in location processor 24 for significance check at step 38. A significant position is one that is different from the previous point by a certain distance or by a certain time difference. For instance, a bus parked at a location for an extensive period of time generates numerous insignificant position data points. In this case, only the first position point and the last point are significant and all the rest are redundant and insignificant. Location processor 24 processes the valid position data and filters out any insignificant data point from further consideration in step 38.

A significant data point warrants a check on location array 28*a*, which is performed at step 40. If the location array 28*a* remains current according to the current position, then there is no need to request update, otherwise location processor 24 issues a request at step 42 to action processor 26 to update location array 28*a*. With location array 28*a* brought current, location processor 24 then identifies at step 44 any meaningful locations from the location array 28*a* that may demand actions. If no meaningful location needing actions exists, then location processor 24 returns to the next position record at step 34 and continues the procedure. If there exist any meaningful locations that demand actions, location processor 24 then generates the list of action items at step 46, and then at step 48 submits requests to action processor 26 for actions.

The second CPU of smart mobile unit 12 comprises action processor 26. Action processor 26 is designed to perform the following functions. First, as location processor 24 may temporarily serve as the host for action processor 26 and upgrade its operating system, applications, and all the existing databases of action processor 26, action processor 26 may in turn serve as the temporary host for location processor 24 to take over all the functions performed by location processor 24, upgrade its operating system, applications, and all the databases of location processor 24. This function is reciprocal between location processor and action processor 26 and is crucial to enable the ALDNS system to be a genuinely automatic and dynamic notification system.

Second, whenever action processor 26 receives a listing of meaningful locations that demand actions from the system, action processor 26 logically checks the location array 28*a* of the listed locations and sorts the required actions. The meaningful locations may contain multiple features and require different types of actions. Action processor 26 prioritizes action types and generates an organized list of action items. For instance, the listing of meaningful locations may contain records of locations that meet the criteria of spatial search, e.g., the current position of the object is within 0.5 miles from a student's house, within 50 ft from a railroad crossing, entering a 25 MPH traffic zone, approaching a landmark, and leaving a regional park. In this example, the action item of top priority may be calling the student to inform the approaching of the bus, and sending the railroad-crossing event to control center 14 as an event record. Some meaningful locations may require immediate action while others may demand no action at all. In addition to the location array 28*a*, action processor 26 also examines the meaningful location in terms of recipients associated with each meaningful location. A second array stored in data module 28, recipient array 28*b*, is also examined and any recipients of notification must be identified. The result of the second function is a reduced set of clearly defined action items organized according to their priority.

Third, action processor 26 takes the action items and carries out the required actions. The action items may include any one or more of the following categories. First, actions of notification are provided. In particular, action processor 26 issues a notification message to one or more recipients. The information to be processed includes the identities of the appropriate recipients, the contents of the notification message, and the means of communications for issuing the notification. For instance, when a special-education bus is approaching a student's house and is expected to arrive in ten minutes, the action item is to activate a phone call to the house. Another typical example is that, in the case of transportation operations of law enforcement agencies, a notification can be issued to the dispatcher that a transportation bus is approaching a court. Second, event recordings are provided. In particular, action processor 26 requests a command to record the current position of the object and other information about the object, including the time, date, its speed, direction, position, and any related actions to be taken for the event. Third, array updates are provided. In particular, since the object is moving, action processor 26 must at all times determine if the current position requires an update of the location array 28*a* and its associated recipient array 28*b*. In mathematical terms, this is a point-in-a-polygon check where an algorithm is implemented to check if the current position of the object, represented as a point feature, is inside a complex polygon or not. Based on the current position and the direction of movement, the algorithm in action processor 26 must decide if the object is leaving one area and entering another with a different set of meaningful locations.

The function of array updating is another major element since this function allows the information of meaningful locations and possible recipients to be updated on the fly in real-time. With this feature, while the object is moving, the information set that needs to be processed to determine where to issue notifications, who to receive notifications, and how a notification message is to be sent to a specific recipient, can all be updated automatically without any human intervention from either the driver or the dispatcher. Whenever the current position of the object is beyond the previous set of meaningful locations, action processor 26 detects the need and requests an update of both location array 28*a* and recipient array 28*b* from the system processor 16.

FIG. 3 is a flow diagram which illustrates the operation of array updating handled by action processor 26. Whenever location processor 24 receives at step 50 a position update with a valid and significant position, a location check is executed at step 52 to determine if the location array 28*a* is current. If the current position is beyond the boundaries of the current location array 28*a*, then a request for an array update is issued by system processor 16 at step 54. If there is no need to update the location array 28*a*, a check on the status of recipient array 28*b* is carried out at step 56. It is possible that the recipient array 28*b* may change over time while the location array 28*a* remains current. If an array update is needed, action processor 26 sends the request to system processor 16 and at step 58 system processor 16 returns the current location array 28*a* data and/or recipient array 28*b* data to the smart mobile unit 12.

Action processor 26 executes the appropriate action items through the Input/Output (I/O) module 30. Multiple action items of different types may be generated at the same location at the same time. Multiple types of communication means used for notification. A notification can be sent to a cellular phone, a pager, a mobile data terminal (MDT) commonly used by public safety agencies, a mobile data computer (MDC) used by law enforcement agencies, a personal data assistant (PDA), or a regular land-based telephone. The notification can be issued either directly from smart mobile unit 12 or from communication module 18 within the control center 14, depending on the appropriate type of action. For instance, when a prisoner's transportation bus is approaching a court, the same bus-approaching message can be issued to three different recipients at the same time: one to be sent to the MDT in the captain's unit, a second message to be sent to the computer of the dispatcher in a dispatch center, while a third message can be sent to the cellular phone of a deputy assigned to be at the court.

I/O module 30 supports wireless communications with both any designated recipient and the control center 14. Depending on the required action, a message can be sent to control center 14 for event recording and meanwhile the same message can be issued to a PDA carried by a recipient. This capability is especially important and useful for operations of special-education buses. For instance, when such a special-education bus approaches a student's house, a phone call can be made directly to the house without going through any base station or control center 14. Meanwhile, the message is sent to the transportation center or control center 14 for event recording. Both messages are sent in an unattended manner. With this capability, any application of prearrival notification can be handled in a very flexible manner. To inform the parents of the arrival of a special-education bus, for example, action processor 26 may decide that notification in the form of a telephone call is better made directly from smart mobile unit 12 to the student house, since a direct call can avoid delay of the notification and minimize the possible interruption of wireless communications. If action processor 26 decides that the same event must also be recorded, then the message can be issued immediately to the control center 14 or to be issued at a later time since the message is for event recording only. If for any reason the notification should be double checked by a dispatcher prior to issuing, then the message can be sent to the computer of the dispatcher for verification before making the call. The dispatcher may double check the status of the student to determine if there is any change in the busing need. The procedure of determining which action is appropriate to take and which communication means to be employed is handled in action processor 26.

If the current position demands an update of the location array 28*a* and/or the recipient array 28*b* in data module 28, action processor 26 passes the request to the I/O module 30, which in turn sends the request to the control center 14 for processing. Once a revision of the location array 28*a* and recipient array 28*b* is returned to action processor 26 through I/O module 28, action processor 26 passes the revision to data module 28 to overwrite the previous location array 28*a* and recipient array 28*b* with the revised data.

Data module 28 as stated above contains two dynamically organized arrays that are constantly updated as the object moves, the location array 28*a* and the recipient array 28*b*. The location array 28*a* contains a set of meaningful locations where certain events may take place surrounding a specific region. The events and actions are part of the records in the data set. The location array 28*a* is to be checked by action processor 26 whenever a new valid position reading is established in the smart mobile unit 12. The recipient array 28*b* contains a set of recipients of possible notifications with different event types, message contents, and communication means. The recipient array 28*b* is closely associated with the location array 28*a* since recipients vary from place to place according to the location of the object. The information that must be conveyed for different events is also included in the recipient array 28*b*.

FIG. 4 is a flow diagram of the operation of notification processing carried out in the action processor 26. When location processor 24 issues a request for action at step 60, action processor 26 evaluates the meaningful locations for actions according to the location array 28*a* at step 62. Once the meaningful locations are all evaluated, action processor 26 decides if there is any need for notifications at step 64. If there is no notification needed, action processor 26 evaluates from the location array 28*a* at step 66 whether the event must be recorded even if a notification is not necessary. If no event recording is needed, then action processor 26 returns to control to location processor 24 for the next set of actions. If at least one notification is needed, action processor 26 first decides at step 68 if the notification is to be issued directly to the recipient. If a direct notification is needed, then the notification is sent out through the I/O module 30 at step 70. For instance, a phone call is made from I/O module 30 on the bus to a student's home phone about the approaching of a special-education bus. Such a phone call does not need to be made at the dispatch center or the control center 14.

Once a direct notification is made, the event is automatically recorded in system processor 16 at step 72 as such event is of significance. If the notification is not to be made directly, then action processor 26 sends at step 74 through its I/O module 30 a request for notification to be issued from system processor 16. Receiving the list of notifications and the appropriate recipients, system processor 16 issues the notifications at step 76 through its communication module 18. The event is automatically recorded in system processor 16.

The control center 14 comprises: (1) a system processor 16 which is a computer with enough processing capacity to effectively handle large databases and large volumes of traffic among different components of the system; (2) a communication module 18 to handle the wireless communications with smart mobile units 12 and both wired and wireless communications with recipients 32; (3) a master database 20 that contains: (a) records of all the meaningful locations that may be considered for action and information about recipients to issue any notifications, (b) a geographic information system with the database of streets and other map features, and (c) a database of detailed vehicle history and actions taken at each location.

System processor 16 comprises a computer of sufficiently large capacity with a fast enough CPU to effectively handle transactions of numerous records and numerical computations. At the current level of technology, to serve an application for a typical agency like the size of Orange County Sheriffs Department in California with 250 patrol units, or St. Louis Unified School District with 250 school buses, a minimum configuration of the system processor 16 is a computer of Pentium IV, 1.6 GHz CPU, 1 GB RAM, with 80 GB of HD space. Faster processors and more RAM will enhance the performance significantly. The hardware specifications have to be upgraded for a system to serve a larger agency or a larger school district. Dual CPUs to support parallel processing and double the size of RAM is desirable for a better performing system.

The primary functions of system processor 16 are communication control and numerical computations, with all the different requests and data types must be well defined and processed in system processor 16. System processor 16 supports the digitization of spatial features such as delineating the street segments of an area and organizes such map features in master database 20, and process the comparison of any position with the map features. While all the data associated with the system, including locations, recipients, maps, and the history database of all the objects, the numerical computation of any data processing is handled by system processor 16.

Communication module 18 comprises multiple means for wired and/or wireless communications, including voice modems for sending voice messages, digital radio modems for sending and receiving digital data through wireless communication networks or digital RF channels, land-based phone lines, satellite communication networks, and/or any other means of communications needed for the recipients. The communication system established in the dispatch center of a law enforcement agency is a typical configuration of communication module 18. In such a typical setting, the dispatcher can identify any patrol unit at any time through an automatic vehicle location (AVL) system, receive and send data to and from any patrol unit through the data communication channel, make dispatch commands to any specific officer through the RF network, maintain digital communications through two-way pagers with patrol units, and have a land-based phone system to communicate with a caller or any officer.

Communication module 18 is designated to perform the following functions. First, it receives vehicle location information and requests for actions from smart mobile units 12's I/O module 30. Second, it sends updated records of location array 28*a* and recipient array 28*b* to the designated smart mobile unit 12 if such updates are needed due to the change of the object's location. Third, it sends messages to appropriate recipients 32 through various communication methods, including regular land-based telephones, cellular phones, one-way or two-way pagers, wireless enabled PDAs, mobile data terminals (MDT), mobile data computers (MDC), the computer of a client with Internet connection, etc. Fourth, it receives requests from recipients 32 of the service regarding any change of the object's status, the response content, the communication means, etc. Fifth, it updates the records of the Master Location Database and the Recipient Database whenever necessary. Sixth, it records information about the object, its location, time speed, direction, and events that took place at the moment.

Master database 20 contains records of all the meaningful locations, including point features, line features, and polygon features, such as schools, students' houses, landmarks, parks, etc., and the variable buffer distance associated with each feature. Since the size of the database tends to be very large, a well-developed database system, such as Oracle and SQL Server of Microsoft, would be required to serve as the Master Database. Database 20 is constantly updated and sub-sets of the records are sent to each smart mobile unit 12 to update its corresponding location array 28*a* and recipient array 28*b*. All the records must be sorted by a combination of latitude and longitude so that the set of records for any particular location of an smart mobile unit 12 is organized in the adjacent space to maximize the performance of spatial search. The location database is organized in a GIS for efficient management of spatial data. Thus database 20 may contain multiple map layers such as streets, municipal boundaries, jurisdictions, school boundaries, water district boundaries, commercial land-use zones, etc.

Recipients 32 of notifications ought to be organized in the database 20 closely related to the location database. In the dispatch system of a law enforcement agency, when a prisoner transportation bus approaches a court, there could be multiple recipients of the same message, including the dispatcher, the captain, and the deputy assigned at the court. The dispatcher is located at the dispatch center, the captain is in a patrol unit, and the court deputy is at the court. All three recipients must be informed about the approaching of the bus. Likewise, when a special-education bus approaches a student's house, both the student's phone and the dispatcher's computer must receive the same approaching message. In the recipient database, each record contains the recipient's name or affiliation, the type of events a message must be received, the communication method or methods to be employed, the content of the message, and any other attributes related to the recipient's requirements. This database can be constantly updated and new recipients can be added while other recipients can be removed.

FIG. 5 is a flow diagram of the operation that takes place in the control center 14. Whenever there is a request at step 78 for action issued from action processor 26, system processor 16 decides at step 80 if the request is for the update of either location or recipient data, or both, and then at step 82 if the request is for a notification to be issued. If neither is needed, then the request is recorded in master database 20 for future examination. If the request is for a location/recipient update, system processor 16 takes the current position and search inside master database 20 for the corresponding location array 28a and recipient array 28b at step 84, and returns the revision to action processor 26 at step 86. If the request is for notification, system processor 16 issues the notification commands at step 88 to communication module 18, which in turn send outs notifications. If receipt of the notification is acknowledged at step 90, the event is recorded in master database 20 at step 92 as a successful notification. If no acknowledgement is received from the recipient, then the communication module 118 will repeatedly send the same notification until time out at step 88, then the event will be recorded as unsuccessful.

The illustrated embodiments of the invention is applicable to numerous situations which include, but are not limited to inmate transportation, or special education transportation.

Law enforcement agencies transport inmates between courts, jails, and offices. The dispatcher needs to be aware of the whereabouts of any bus at any time and the notification of the leaving, approaching, and arrival of a bus at a given location not only for location tracking to ensure security, but also for providing significantly useful information to maximize the efficiency of the operation. In this example, when a prisoner bus leaves a jail and heads for court, the dispatcher, the captain, and the court deputy are all informed of the trip. If there is another inmate to be picked up at an office between the jail and the court, the dispatcher can issue a request for a route change to a mobile data terminal (MDT) installed in the bus to change its route. The guard on the bus, upon receipt of the request for route change, can respond with an acknowledge signal so that the dispatcher can assign the inmate to the bus. In this situation, the prior art relying on a fixed route will not work to accommodate the route change in the middle of the operation. While the guard on the bus acknowledges the route change request, the deputy at the office is immediately informed that the bus is coming and will be arriving within a certain time. In this case, the prior art that depends on the fixed stop location will not be able to generate the new notification dynamically.

When the bus approaches the office and is within an appropriate distance from the office, a message is automatically issued to the deputy in the office so that the deputy can get the inmate ready and move the inmate to the boarding area. When the bus arrives at the office, another message is sent to the captain and the dispatcher about the arrival of the bus at the office. When the bus leaves the office, a message is also sent to the dispatcher.

When the bus continues to move to the court, for some reason it deviates from the route to the court by a significant distance. A warning message is automatically issued to the dispatcher and the captain. The dispatcher can look at the computer and identify the current location of the bus on the map with the locations of the office and the court, and the common route between the two locations, displayed on the computer monitor. The dispatcher may immediately issue a request for the guard to respond. The guard on the bus may indicate a legitimate reason for the route change, such as traffic conditions, and the captain is informed of the situation. Since the route is different from the common route, the locations that the bus will traverse are totally different from those along the common route. In this case, the prior art where notification depends on a given set of locations will lose track of the entire operation. This system enables the driver to alter the route while the entire notification mechanism remains active.

Finally, the bus is approaching the court from a different direction due to the route change. A message of bus approaching is issued to the deputy at the court, and both the dispatcher and the captain are informed of the bus status. In this entire operation, the captain may or may not need to take any action, and all the vehicle activities are recorded in the captain's MDC and the dispatch center's activity log database.

The illustrated embodiment of the invention is particularly useful for notification of the arrival of school buses that serve the special education students on wheelchairs. The situation is quite different from a fixed route with fixed location of bus stops where students board the buses. In special education bussing, the bus goes to the house of the student to pick up the student, and the route may change on a daily basis. The driver may change the course of the route for many different reasons. As such, the prior art of a fixed route, schedule-based notification system will fail. According to this invention, the bus may leave either the driver's home where the bus was parked the night before, or the transportation yard, or the school and a message is indicated on the computer of the dispatcher. The driver is heading for the first student on the list of pick-up. At this moment, the dispatcher receives a call from the parent of another student requesting a unscheduled pick-up. The student's home is closer to the bus than that of the first student, and the bus has the capacity to pick up this additional student. The message is passed to the driver by any means, through the radio, the MDT, or pager.

As soon as the driver receives the request for adding another student and the student's address, the driver decides to change the current route and make a turn at the next intersection. The route is changed and the notification system remains active. As the bus is approaching the added student, a message of bus approaching is issued automatically to both the dispatcher and the student's home. The student can get ready for boarding while the bus is arriving. To go the next student's home from the current location, the route is no longer the same as before, yet the method will continue to work as the bus is arriving from a different street. Both the second student's home and the dispatcher receive the notification of the bus arrival. With this automatic, dynamic notification system, neither will the driver have to wait for the student getting ready, nor will a wheel-chaired student have to wait outside on the lawn for the bus in a cold winter.

One of the significant differences between the prior art of a prearrival notification system and the system according to the invention is in the functionality of location processor 24. First, this invention does not rely on a preset schedule with preset arrival time at any predefined stop location. Second, this system handles the location information in a dynamic and automated manner, unlike the prior art that always requires a set of previously entered positions to issue any notification. In this system, the location set can be automatically updated as the object moves, and the updating of the location set does not require any human action in the object, i.e., the updating of location set can be automatically handled through the wireless communications without the driver of a bus even noticing the change. Third, the system is not limited to a specific type of notification, such as arrival time of the vehicle. This system allows for notifications of approaching of a vehicle to a meaningful location, leaving a location, entering the territory of a specific zone, deviating from a route by a specific distance, driving over 45 MPH within 35 MPH traffic zones, etc. Fourth, the different types of notifications and the set of meaningful locations for each type can be dynamically and automatically changed while the object is moving. This characteristic is crucial in the sense that the set could be extremely large if the object is to operate in a large area and numerous types of meaningful locations will be handled. By being able to dynamically change the set of meaningful locations, the system always keeps a minimal set of such locations inside smart mobile unit 12. The comparison of current position against the array of meaningful locations can be done in a reasonable effective manner. Without this capability, there is no way for a processor to compare the current position with twenty million meaningful locations within a state, some of them are point features, others line and polygon features, with each associated with a different buffer distance.

Thus, it can now be appreciated that the illustrated embodiments of the invention are characterized by the following features. According to the present invention, methods and apparatuses are provided for automated, location-based, dynamic notification. The smart mobile unit comprises a position module to receive position data, a location processor to process location data, an action processor to construct action items, a data module to keep a dynamic set of locations and recipients, and an i/o module, to handle data input and output from the mobile unit.

While the prior art of notification system has one processor in the mobile unit hardware, the smart mobile unit comprises dual processors capable of parallel processing. In other words, in the smart mobile unit, there are at least two independently operating and interrelated microprocessors, or CPU's (Central Processing Units). The two microprocessors play different roles simultaneously. One functions as the location processor and the other functions as the action processor. These two processors can reverse roles whenever necessary, i.e., when needed, the CPU of action processor can change its role to be location processor and location processor can change its role as the action processor. This property enables the firmware inside the mobile unit hardware to be updated through the wireless communication network and ensures a completely automatic, dynamic notification operation.

The operating system of location processor and action processor can be updated remotely and electronically. To do so, action processor can temporarily take over all the functions as location processor and serve as the location processor host, to receive remotely from the system's communication module a revision of the operating system of location processor, shut down location processor temporarily, replace location processor's operating system, update all application programs on location processor, update all the databases on location processor, and then restart location processor to regain its role. Likewise, location processor can temporarily serves as action processor host, shut down action processor, receive the revised operating system of action processor, replace the operating system of action processor, replace all the application programs on action processor, replace all the databases of action processor, and restart action processor and make action processor return its role. This mechanism allows for this notification system to update any content and any instruction set in the smart mobile unit remotely and electronically. In such a update operation, the smart mobile unit can remain functional at all times without interruption. This also allows the notification system to constantly change its database of locations and recipients without any actions from the driver of a vehicle.

In the present invention, the time to issue a notification is based on location only and not based on schedule. It is the current position of the object that determines if a notification is necessary. Unlike the prior art that is purely based on a schedule with given arrival time, the present invention is a method that is based on location. As such, there is no need to have an on-board clock to check time at any stop and compared that time with a scheduled time of arrival.

The present system determines if any notification should be processed based on a combination of multiple location features. These multiple location features can be represented in computers as point features such as a school or a structure, line features such as streets or sewer lines, polygon features such as parks or administrative zones. Unlike prior art where a notification system is only limited to a given point location, the method of this invention enables simultaneous evaluation of multiple feature types to determine the need of notification.

The system handles multiple types of notifications at the same time. Commonly used notifications may include arrival, approaching, leaving, entering, crossing, passing, or any other types-associated with the movement of an object. Unlike the prior art of notification systems that handle only one type of notification, this invention expands the notification capability to an unlimited variety. A notification can be issued as an exception report if the vehicle exceeds any dynamically given speed limit.

For the same message, the present invention can issue notifications to multiple recipients through different communication methods at the same time. For instance, a message of the approaching of a transportation bus to a student's house can be sent simultaneously to the land-based telephone at the student's home, the cellular phone of a parent, a text message to the PDA of the transportation director, and the computer of the dispatch center.

Notifications can be issued to recipients in an automatic and unattended manner, i.e., neither the driver of a vehicle nor the dispatcher in a dispatch center needs to take any action and the notification can be issued at the correct time to the appropriate recipient automatically. Thy system does not require the driver to signal the arrival at any given location, adjust the schedule due to the change on the course, or request any kind of notification to be issued. The whole system is automated and the driver does not need to make any contact with the system.

The present system is dynamic wherein a preset schedule with arrival times at different pre-defined stop locations is not necessary. When and where a notification should be issued depends on the current location of the mobile object and such locations for notification can change at any moment even when the object is moving. The location information can be constantly updated while a bus is moving on the streets, and the location information update takes place automatically without the driver's intervention.

The present system allows for a minimum set of location data to be kept in the smart mobile unit at any time, based on the current location of the vehicle. Unlike the method of the prior art, where all the locations that a vehicle must stop must be kept on board, the present system keeps the minimum set of locations in the smart mobile unit and the minimum set could be a small sub-set of the locations that will be involved in the operation.

The present system allows for a minimum set of recipient data to be kept in the smart mobile unit at any time, based on the current location of the vehicle. Unlike the methods of the prior art, where all the recipient data is kept on board, the present system keeps the minimum set of recipients in the smart mobile unit and the minimum set may comprise a small sub-set of the recipients that will be involved in the operation.

The information of locations, named the Location Array in this document, can be updated while the object moves. The current position of the object is checked against the Location Array and if the position is beyond the boundaries of the Location Array, then the Location Array is automatically updated through wireless communications.

The information of recipients, named the Recipient Array in this document, can be updated while the object moves. The status of Recipient Array is checked and the Recipient Array is automatically updated whenever necessary.

The I/O supports communications with both designated recipients and the control center. Depending on the type of action, a message can be sent to the control center to record the event. Another message can be issued to a PDA and an MDT directly. For instance, if a special-education school bus is approaching a student's house, a phone call can be made directly to the house without going through any base station or the control center. With this capability, even a pre-arrival notification can be handled in a flexible manner. For instance, to inform the parents of the arrival of a bus, if action processor considers the notification a straight and simple call that can be made directly from the smart mobile unit, then there is no need to go through the control center or any base station. If action processor decides that same event must also be recorded, then the message can be issued to the control center as well. If action processor decides that the notification should be checked for other considerations, for example, if the student will go to school on this particular day, then the message can be sent to the control center to check if the student's status has been changed recently. The procedure to determine which action to take, or which communication means to use, can be handled by action processor.

Given a GPS reading or any expression of a position on earth, such as the reading of Lat/Long or any coordinate system, a spatial search function is introduced to identify any meaningful locations related to the position reading. A computer program searches throughout the list of meaningful locations within a set range, where the range can be a variable and the system operator may change at any time, and compares the position against all the meaningful locations on the list. The meaningful locations can be represented as point features such as a building or a landmark, line features such as a street, a river, or the border between two administrative areas, or polygon features such as a park, a lake, or the area of a jurisdiction.

In the spatial search mechanism, point features can be represented by a position and a variable buffer zone extending from that position, line features can be represented by a series of-connected points with a buffer zone extended from the line feature, and polygon features can be represented by a polygon and a buffer zone extended outward from the polygon feature. The method for construction of such features is provided in the book "Exploring Spatial Analysis in Geographic Information Systems" by the author of the present invention, Y. H. Chou, High Mountain Press, 1997.

The spatial search for notification is based on any given position of the object. The list of locations contains a set of locations of any combination of point features, line features, and polygon features. At any "current position" expressed as one point location on the map, the system searches for all meaningful locations in the set of locations that the "current position" falls into. The process can follow the method of Point-in-Polygon test described in "Computer Assisted Cartography, Principles and Prospects" by M. S. Monmonier, Prentice Hall, 1982. The locations that are identified are further processed to identify the need of notifications.

Usually not all the meaningful locations identified from the spatial search require a notification. The search function finds all the recipients associated with the identified locations with a need for notification, and compile the set into a list of recipients. This step is needed as many locations may contain the same recipient.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below- in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. An apparatus for providing automated, location-based, dynamic notification, which apparatus communicates to a plurality of recipients in combination with an external positioning system for use with a mobile object, comprising:

a mobile unit collocated with the object; and a control center computer subsystem,
where the mobile unit comprises:
a position module comprising means for automatically generating location data corresponding to the position of the mobile unit as determined by communication with the external positioning system;
a location processor communicated to the position module;
an action processor communicated to the location processor, the action processor generating location-based data and the location processor comprising means for automatically processing the location data generated by the position module and the location-based data generated by the action processor;
a data module communicated to the action processor; and
an I/O module communicated to the action processor,
where the control center computer subsystem comprises:
a system processor;
a communication module communicated to the systems processor; and
a master database communicated to the systems processor, and
where the I/O module of the mobile unit and the communication module of the control center computer subsystem are intercommunicated with each other,
where location processor automatically associates a relationship between the location data and a locational feature stored in the data module with a need for notification action by the action processor,
where the location processor automatically generates a plurality of action demands, and
where the action processor receives the plurality of action demands and prioritizes the plurality of action demands.

2. The apparatus of claim 1 where the location processor automatically validates the location data received from the position module.

3. The apparatus of claim 1 where the location processor automatically filters the location data received from the position module for redundancy.

4. The apparatus of claim 1 where the location processor automatically determines significance of the association based on locational information stored in the data module.

5. The apparatus of claim 1 where the location processor automatically determines the significance of the association based on locational information, which characterizes a point feature and a buffer zone associated with the point feature.

6. The apparatus of claim 1 where the location processor automatically determines the significance of the association based on locational information, which characterizes a line feature and a buffer zone associated with the line feature.

7. The apparatus of claim 1 where the location processor automatically determines the significance of the association based on locational information, which characterizes a polygonal feature and a buffer zone associated with the polygonal feature.

8. The apparatus of claim 1 where the location processor automatically and contemporaneously determines the significance of the association based on locational information, which characterizes a plurality of features and a buffer zone associated with each of the plurality of features.

9. The apparatus of claim 1 where the location processor selectively and automatically serves as a host for the action processor when the action processor is systematically updated.

10. The apparatus of claim 1 where the action processor selectively serves as a host for the location processor when the location processor is systematically updated.

11. The apparatus of claim 1 where the action processor and location processor selectively and automatically serve as a host for each other when either one is systematically updated.

12. The apparatus of claim 1 where the action processor automatically associates recipient identities stored in the data module with the prioritized plurality of action demands.

13. The apparatus of claim 12 where the action processor automatically controls the I/O module to perform the prioritized plurality of action demands.

14. The apparatus of claim 13 where the action processor automatically generates at least one notification message sent to at least one of the plurality of recipients in response to one of the prioritized action demands.

15. The apparatus of claim 14 where the notification message automatically generated by the action processor comprises an identity of the recipient content of an informational message, and means of communication to the identified recipient.

16. The apparatus of claim 13 where the action processor automatically generates an event recording in response to one of the prioritized action demands.

17. The apparatus of claim 13 where the action processor automatically generates a data array update of information stored in the data module in response to one of the prioritized action demands.

18. The apparatus of claim 17 where the automatically generated data array update by the action processor updates locational information stored in the data module according to the location data generated by the position module.

19. The apparatus of claim 17 where the automatically generated data array update by the action processor updates recipient information stored in the data module according to the location data generated by the position module.

20. The apparatus of claim 1 where pursuant to selective control by the action processor the I/O module provides communication to the recipient by wired or wireless means according to the event and recipient in question.

21. The apparatus of claim 1 further comprising a plurality of mobile units and where the system processor automatically controls communication to and from the plurality of mobile units and to the master database through the communication module.

22. The apparatus of claim 1 where pursuant to selective control by the system processor the communication module provides communication to the recipient by wired or wireless means according to the event and recipient in question.

23. The apparatus of claim 1 where the master data base stores: (a) records of all meaningful locations subject to possible action and information about recipients to whom notifications may be issued; (b) a geographic information system with a database of streets and map features; or (c) a database of detailed vehicle history and actions taken at each meaningful location.

24. The apparatus of claim 1 where the communication module receives location data from the position module corresponding to the location of the object, communicates updates to the data module, provides bidirectional communication with the recipients, receives updates to the master database, and receives event information for recordal from the mobile unit.

25. The apparatus of claim 1 where the locational feature is included in a plurality of a locational features, and where the location processor automatically associates the relationship between the location data and the plurality of locational features stored in the data module with the need for notification action by the action processor.

26. The apparatus of claim 25 where the plurality of locational features include a point feature, a line feature, a polygonal feature, or a combination thereof.

27. The apparatus of claim 1 where the I/O module or communication module communicate the notification action, include at least one of the notifications comprised of notifications relating to arriving, approaching, leaving, entering, crossing, passing, or any other movement of the object.

28. The apparatus of claim 1 where the I/O module or communication module contemporaneously communicates the notification action to multiple recipients through different communication channels.

29. The apparatus of claim 28 where the different communication channels comprise at least two of the following: a land-based telephone network connected to a first recipient, a cellular phone network communicated to a second recipient, a text message to a PDA of a third recipient, or a computer network communicated to a fourth recipient.

30. The apparatus of claim 1 where at any given time the data module stores a subset of locational information stored in the master data base.

31. The apparatus of claim 1 where at any given time the data module stores a subset of recipient information stored in the master data base.

32. The apparatus of claim 30 wherein the subset of locational information stored in the data module is automatically updated by the control center computer subsystem depending on location of the mobile unit.

33. The apparatus of claim 31 wherein the subset of recipient information stored in the data module is automatically updated by the control center computer subsystem depending on location of the mobile unit.

34. The apparatus of claim 1 where the action processor controls the I/O module to selectively communicate directly with the recipient or control center computer subsystem.

35. The apparatus of claim 1 where the action processor receives a point location from the location processor based on a position fix determined by the position module and retrieves a plurality of locational features stored in the data module corresponding to the point location.

36. The apparatus of claim 35 where the action processor retrieves all recipients stored in the data module which correspond to any one of the retrieved locational features and compiles a list of recipients for which a notification message is to be generated, the action processor generates the notification message and selectively communicates the notification message to all corresponding recipients through the I/O module, each notification message being communicated according to a selected means chosen from a plurality of different means of communication available with the recipients.

37. An apparatus for providing automated, location-based, dynamic notification in combination with a control center computer, which apparatus communicates to a plurality of recipients in combination with an external positioning system for use and collocated with a mobile object comprising:
a position module;
a location processor communicated to the position module;
an action processor communicated to the location processor;
a data module communicated to the action processor; and
an I/O module communicated to the action processor, the recipients and the control center computer
where the location processor automatically generates a plurality of action demands, and
where the location processor receives the plurality of action demands and prioritizes the plurality of action demands.

38. The apparatus of claim 37 where the control center computer comprises:
a system processor;
a communication module communicated to the systems processor, the recipients and the I/O module; and
a master database communicated to the systems processor.

39. The apparatus of claim 37 where the position module comprises means for automatically generating location data corresponding to the position of the mobile object as determined by communication with the external positioning system.

40. The apparatus of claim 37 where the action processor generates location-based data and the location processor comprises means for automatically processing the location data generated by the position module and the location-based data generated by the action processor.

41. The apparatus of claim 40 where the location processor automatically validates the location data received from the position module.

42. The apparatus of claim 40 where the location processor automatically filters the location data received from the position module for redundancy.

43. The apparatus of claim 37 where the location processor automatically associates a relationship between the location data and a locational feature stored in the data module with a need for notification action by the action processor.

44. The apparatus of claim 43 where the location processor automatically and contemporaneously determines the significance of the association based on locational information, which characterizes a plurality of features and a buffer zone associated with each of the plurality of features.

45. The apparatus of claim 37 where the location processor selectively and automatically serves as a host for the action processor when the action processor is systematically updated.

46. The apparatus of claim 37 where the action processor selectively serves as a host for the location processor when the location processor is systematically updated.

47. The apparatus of claim 1 where the action processor automatically associates recipient identities stored in the data module with the prioritized plurality of action demands.

48. The apparatus of claim 47 where the action processor automatically generates a data array update of information stored in the data module in response to one of the prioritized action demands.

49. The apparatus of claim 37 where the action processor retrieves all recipients stored in the data module which correspond to any one of the retrieved locational features and compiles a list of recipients for which a notification message is to be generated, the action processor generates the notification message and selectively communicates the notification message to all corresponding recipients through the I/O module, each notification message being communicated according to a selected means chosen from a plurality of different means of communication available with the recipients.

* * * * *